(12) United States Patent
Kato et al.

(10) Patent No.: US 10,506,184 B2
(45) Date of Patent: Dec. 10, 2019

(54) SOLID-STATE IMAGE PICKUP ELEMENT, METHOD OF DRIVING SOLID-STATE IMAGE PICKUP ELEMENT, AND ELECTRONIC APPARATUS

(71) Applicant: SONY SEMICONDUCTOR SOLUTIONS CORPORATION, Kanagawa (JP)

(72) Inventors: Akihiko Kato, Tokyo (JP); Hung Luong, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 15/761,721

(22) PCT Filed: Aug. 31, 2016

(86) PCT No.: PCT/JP2016/075418
§ 371 (c)(1),
(2) Date: Mar. 20, 2018

(87) PCT Pub. No.: WO2017/061191
PCT Pub. Date: Apr. 13, 2017

(65) Prior Publication Data
US 2018/0352178 A1    Dec. 6, 2018

(30) Foreign Application Priority Data
Oct. 9, 2015    (JP) .................. 2015-200901

(51) Int. Cl.
*H04N 5/357* (2011.01)
*H04N 5/376* (2011.01)
(Continued)

(52) U.S. Cl.
CPC ............. *H04N 5/357* (2013.01); *H04N 5/353* (2013.01); *H04N 5/3577* (2013.01);
(Continued)

(58) Field of Classification Search
CPC ........ H04N 5/357; H04N 5/353; H04N 5/376; H04N 5/378; H04N 5/372; H04N 5/3765; H04N 5/3742; H04N 5/374
See application file for complete search history.

(56) References Cited

U.S. PATENT DOCUMENTS

2007/0070219 A1* 3/2007 Morimoto .............. H04N 5/232
                                                                    348/231.99
2011/0234867 A1    9/2011 Sato et al.
2012/0199724 A1    8/2012 Nomura et al.

FOREIGN PATENT DOCUMENTS

JP    2005-341278 A    12/2005
JP    2007-096633 A    4/2007
(Continued)

OTHER PUBLICATIONS

International Search Report and Written Opinion of PCT Application No. PCT/JP2016/075418, dated Oct. 18, 2016, 15 pages.

*Primary Examiner* — Ahmed A Berhan
(74) *Attorney, Agent, or Firm* — Chip Law Group

(57) ABSTRACT

A solid-state image pickup element according to the present disclosure includes an analog circuit unit that performs reading of a pixel signal from a unit pixel and to perform A/D conversion processing, a digital circuit unit that performs signal output processing of outputting pixel data after the A/D conversion processing, in parallel with the reading of the pixel signal and the A/D conversion processing, and a control unit that causes the digital circuit unit to perform the processing over a period from a processing start timing to a processing finish timing in the analog circuit unit, while
(Continued)

the control unit is controlling a speed of a clock being a criterion for an operation of the digital circuit unit.

11 Claims, 10 Drawing Sheets

(51) Int. Cl.
    *H04N 5/374*     (2011.01)
    *H04N 5/353*     (2011.01)
    *H04N 5/378*     (2011.01)

(52) U.S. Cl.
    CPC ............. *H04N 5/374* (2013.01); *H04N 5/376* (2013.01); *H04N 5/378* (2013.01); *H04N 5/3742* (2013.01); *H04N 5/3765* (2013.01)

(56) References Cited

FOREIGN PATENT DOCUMENTS

| | | |
|---|---|---|
| JP | 2009-105852 A | 5/2009 |
| JP | 2010-130235 A | 6/2010 |
| JP | 2012-165168 A | 8/2010 |
| JP | 2011-205225 A | 10/2011 |
| JP | 2011-211507 A | 10/2011 |

\* cited by examiner

SOLID-STATE IMAGE PICKUP ELEMENT, METHOD OF DRIVING SOLID-STATE IMAGE PICKUP ELEMENT, AND ELECTRONIC APPARATUS

CROSS REFERENCE TO RELATED APPLICATIONS

This application is a U.S. National Phase of International Patent Application No. PCT/JP2016/075418 filed on Aug. 31, 2016, which claims priority benefit of Japanese Patent Application No. JP 2015-200901 filed in the Japan Patent Office on Oct. 9, 2015. Each of the above-referenced applications is hereby incorporated herein by reference in its entirety.

TECHNICAL FIELD

The present disclosure relates to a solid-state image pickup element, a method of driving the solid-state image pickup element, and an electronic apparatus.

BACKGROUND ART

For example, charge coupled device (CCD) image sensors (CCD-type solid-state image pickup elements) or complementary metal oxide semiconductor (CMOS) image sensors (CMOS-type solid-state image pickup elements) have been known as solid-state image pickup elements. In addition, in recent years, the CMOS-type solid-state image pickup elements have attracted attention from the viewpoint of, for example, miniaturization and power consumption.

There is a CMOS image sensor including a digital circuit unit that performs, for example, processing of a video signal with digital processing and is mounted together with an analog circuit unit including a pixel array unit and an A/D converter, on the same chip (a semiconductor substrate). Mounting the digital circuit unit together with the analog circuit unit on the same chip in this manner causes digital noise arising from, for example, a variation in potential between a power source and a ground in the circuit operation of the digital circuit unit. The noise exerts an adverse effect on the circuit operation of the analog circuit unit, resulting in degradation in image quality.

In order to avoid the degradation in image quality arising from the digital noise, conventionally, increasing the speed of a clock pulse in signal processing by the digital circuit unit, causes the digital circuit unit to perform the signal processing during a horizontal blanking period during which signal reading from a pixel is not performed (e.g., refer to Patent Document 1). In addition, for a configuration including the digital circuit unit and the analog circuit unit not mounted together on the same chip, the digital circuit unit artificially starts to operate before the analog circuit unit starts to operate, in order to avoid the degradation in image quality arising from the digital noise (e.g., refer to Patent Document 2).

CITATION LIST

Patent Document

Patent Document 1: Japanese Patent Application Laid-Open No. 2007-96633
Patent Document 2: Japanese Patent Application Laid-Open No. 2009-105852

SUMMARY OF THE INVENTION

Problems to be Solved by the Invention

Here, with a solid-state image pickup element capable of responding to a high frame rate of video signal, a horizontal synchronizing period being a criterion for operation timing is short, and accordingly, a horizontal blanking period during which signal reading is not performed is short. Then, an excessively short horizontal blanking period causes the digital circuit unit to have difficulty in performing the signal processing during the horizontal blanking period for the conventional technology described in Patent Document 1. In addition, for the conventional technology described in Patent Document 2, since the digital circuit unit artificially starts to operate in order to cover a reading operation during the horizontal synchronizing period, the artificial start operation causes power consumption to increase.

An object of the present disclosure is to provide: a solid-state image pickup element capable of avoiding degradation in image quality arising from digital noise, independently of the length of a horizontal blanking period, with no increase in power consumption; a method of driving the solid-state image pickup element; and an electronic apparatus including the solid-state image pickup element.

Solutions to Problems

An solid-state image pickup element according to a first aspect of the present disclosure for achieving the object, includes: an analog circuit unit configured to perform reading of a pixel signal from a unit pixel and to perform A/D conversion processing; a digital circuit unit configured to perform signal output processing of outputting pixel data after the A/D conversion processing, in parallel with the reading of the pixel signal and the A/D conversion processing; and a control unit configured to cause the digital circuit unit to perform the processing over a period from a processing start timing to a processing finish timing in the analog circuit unit while the control unit is controlling a speed of a clock being a criterion for an operation of the digital circuit unit. In addition, an electronic apparatus according to the first aspect of the present disclosure for achieving the object includes the solid-state image pickup element.

In a method of driving a solid-state image pickup element according to the first aspect of the present disclosure for achieving the object, the solid-state image pickup element includes: an analog circuit unit configured to perform reading of a pixel signal from a unit pixel and to perform A/D conversion processing; and a digital circuit unit configured to perform signal output processing of outputting pixel data after the A/D conversion processing, in parallel with the reading of the pixel signal and the A/D conversion processing, and the method includes, causing the digital circuit unit to perform the processing over a period from a processing start timing to a processing finish timing in the analog circuit unit, while controlling a speed of a clock being a criterion for an operation of the digital circuit unit.

A solid-state image pickup element according to a second aspect of the present disclosure for achieving the object, includes: an analog circuit unit including an A/D converter including a comparator configured to compare a pixel signal and a reference signal, the analog circuit unit being configured to perform reading of the pixel signal from a unit pixel and to perform A/D conversion processing; a digital circuit unit configured to perform signal output processing of outputting pixel data after the A/D conversion processing, in parallel with the reading of the pixel signal and the A/D conversion processing; and a control unit configured to supply a clock being a criterion for an operation to the digital circuit unit during at least one of a reset period and a pixel signal A/D conversion period in the comparator. In addition, an electronic apparatus according to the second aspect of the present disclosure for achieving the object, includes: the solid state image pickup element.

In a method of driving a solid-state image pickup element according to the second aspect of the present disclosure for achieving the object, the solid-state image pickup element includes: an analog circuit unit including an A/D converter including a comparator configured to compare a pixel signal and a reference signal, the analog circuit unit being configured to perform reading of the pixel signal from a unit pixel and to perform A/D conversion processing; and a digital circuit unit configured to perform signal output processing of outputting pixel data after the A/D conversion processing, in parallel with the reading of the pixel signal and the A/D conversion processing, and the method includes, supplying a clock being a criterion for an operation to the digital circuit unit during at least one of a reset period and a pixel signal A/D conversion period in the comparator.

Effects of the Invention

According to the present disclosure, the degradation in image quality arising from the digital noise can be avoided, independently of the length of the horizontal blanking period, with no increase in the power consumption.

Note that, the present disclosure is not necessarily limited to the effects described here, and thus any of the effects described in the present specification may be provided. In addition, the effects described in the present specification are just exemplifications, and thus the present disclosure is not limited to the effects. In addition, additional effects may be provided.

MODE FOR CARRYING OUT THE INVENTION

Figure 1:
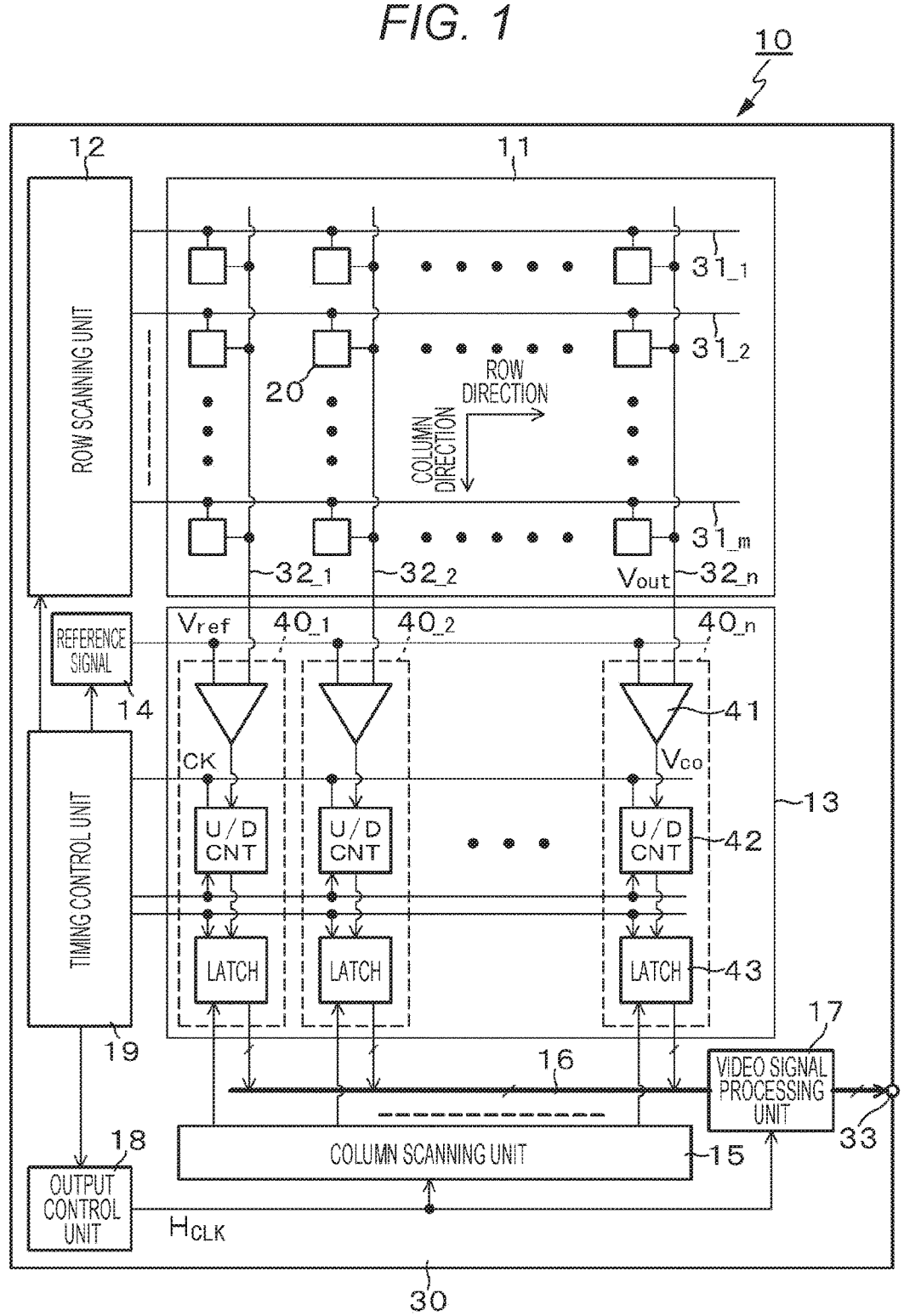
FIG. 1 is a system configuration diagram schematically illustrating the configuration of a CMOS image sensor being a solid-state image pickup element according to the present disclosure.

Modes for carrying out a technology according to the present disclosure (hereinafter, referred to as "embodiments") will be described in detail below with reference to the drawings. The technology according to the present disclosure is not limited to the embodiments. In the following descriptions, the same elements or elements having the same functions are denoted with the same reference signs, and thus the duplicate descriptions thereof will be omitted. Note that, the descriptions will be given in the following order.

1. Overall Descriptions for Solid-State Image Pickup Element, Method of Driving the Same, and Electronic Apparatus according to Present Disclosure
2. Solid-State Image Pickup Element according to Present Disclosure (CMOS Image Sensor)
   2-1. System Configuration
   2-2. Circuit Configuration of Unit Pixel
   2-3. Circuit Configuration of Comparator
   2-4. Basic Circuit Operation of CMOS Image Sensor
3. First Embodiment
4. Second Embodiment
   4-1. Example 1
   4-2. Example 2 (Modification of Example 1)
   4-3. Example 3 (Modification of Example 2)
   4-4. Example 4 (Modification of Example 3)
5. Modification
6. Electronic Apparatus according to Present Disclosure (Exemplary Image Pickup Device)

<Overall Descriptions for Solid-State Image Pickup Element, Method of Driving the Same, and Electronic Apparatus According to Present Disclosure>

For a solid-state image pickup element, a method of driving the solid-state image pickup element, and an electronic apparatus according to a first aspect of the present disclosure, a control unit can be configured to decimate a clock being a criterion for the operation of a digital circuit unit, to control the speed of the clock.

For a solid-state image pickup element, a method of driving the solid-state image pickup element, and an electronic apparatus according to a second aspect of the present disclosure, an analog circuit unit can be configured to perform A/D conversion processing to a reset component and a signal component read on a time-series basis as a pixel signal from a unit pixel. At this time, a control unit can be configured to supply a clock to a digital circuit unit during at least one of a reset period, a reset component A/D conversion period, and a signal component A/D conversion period in a comparator.

For the solid-state image pickup element, the method of driving the solid-state image pickup element, and the electronic apparatus according to the second aspect of the present disclosure including the favorable configuration, the control unit can be configured to supply the clock to the digital circuit unit during at least one of the reset component A/D conversion period and the signal component, except the reset period in the comparator. Furthermore, the control unit can be configured to supply the clock to the digital circuit unit during one of the reset component A/D conversion period and the signal component, while the control unit performs a dummy clock operation and digital operation during the other period.

<Solid-State Image Pickup Element According to Present Disclosure>

First, the configuration of a CMOS image sensor being a solid-state image pickup element according to the present disclosure, will be schematically described.

[System Configuration]

FIG. 1 is a system configuration diagram schematically illustrating the configuration of the CMOS image sensor according to the present disclosure. As illustrated in FIG. 1, the present CMOS image sensor 10 includes a pixel array unit 11, and a driving system and a signal processing system on the periphery thereof. According to the present example, for example, a row scanning unit 12, a column processing unit 13, a reference signal generating unit 14, a column scanning unit 15, a horizontal output line 16, a video signal processing unit 17, an output control unit 18, and a timing control unit 19 are provided as the periphery driving system and signal processing system. The driving system and the signal processing system are integrated on a semiconductor substrate (chip) 30 on which the pixel array unit 11 is provided.

In the system configuration, the timing control unit 19 generates, for example, a clock signal or a control signal being a criterion for an operation for each of the row scanning unit 12, the column processing unit 13, the reference signal generating unit 14, the column scanning unit 15, the output control unit 18 and the like, on the basis of, for example, a vertical synchronizing signal VD, a horizontal synchronizing signal HD, and a master clock MCK to be input externally. For example, the clock signal or the control signal generated by the timing control unit 19 is given, as a driving signal, to the row scanning unit 12, the column processing unit 13, the reference signal generating unit 14, the column scanning unit 15, the output control unit 18 and the like.

The pixel array unit 11 includes unit pixels (hereinafter, also simply referred to as "pixels") 20 arranged in a row direction and a column direction, namely, in a matrix (a two-dimensional matrix), each of the unit pixels 20 including a photoelectric conversion element that generates and accumulates photocharge corresponding to the amount of received light. Here, the row direction means the array direction of the pixels in a pixel row, and the column direction means the array direction of the pixels in a pixel column.

The pixel array unit 11 includes, for a pixel array with m rows and n columns, row control lines 31 ($31_{-1}$ to $31_{-m}$) wired in the row direction, corresponding to the pixel rows and column signal lines 32 ($32_{-1}$ to $32_{-n}$) wired in the column direction, corresponding to the pixel columns. Each of the row control lines 31 transmits a control signal for performing control in reading a signal from each of the unit pixels 20. FIG. 1 illustrates one wired line for each of the row control lines 31, but the number of the each of the row control lines 31 is not limited to the one. One end of each of the row control lines $31_{-1}$ to $31_{-m}$ is connected to an output end in the row scanning unit 12, the output end corresponding to the row.

The row scanning unit 12 includes a shift register, an address decoder and the like, and drives the pixels 20 in the pixel array unit 11 simultaneously or in units of rows, for example. The illustration for the specific configuration of the row scanning unit 12 will be omitted. Typically, the row scanning unit 12 includes two scanning systems of a reading scanning system and a sweep scanning system. The reading scanning system sequentially selectively scans the unit pixels 20 in the pixel array unit 11, in units of rows in order to read a signal from each of the unit pixels 20. The signal read from each of the unit pixels 20 is an analog signal. The sweep scanning system performs sweep scanning to a row to be read to which the reading scanning is performed by the reading scanning system, ahead of the reading scanning by the time of a shutter speed.

The sweep scanning of the sweep scanning system sweeps unnecessary electric charge from the photoelectric conversion elements in the unit pixels 20 in the row to be read, so that the photoelectric conversion elements are reset. Then, the sweep (reset) of the unnecessary electric charge by the sweep scanning system, allows a so-called electronic shutter operation to be performed. Here, the electronic shutter operation means an operation of discharging the photocharge in the photoelectric conversion elements to start exposure anew (starting to accumulate photocharge).

Each of the signals reads by the reading operation of the reading scanning system, corresponds to the amount of light received from the previous reading operation or the electronic shutter operation onward. Then, the period from the reading timing of the previous reading operation or the sweep timing of the electronic shutter operation until the reading timing of the present reading operation is an exposure period for the photocharge in each of the unit pixels 20.

The column processing unit 13 is, for example, a signal processing unit including analog/digital (A/D) converters 40 ($40_{-1}$ to $40_{-n}$) provided corresponding to the pixel columns in the pixel array unit 11, namely, the column signal lines 32 ($32_{-1}$ to $32_{-n}$) one by one. Each of the A/D converters 40 ($40_{-1}$ to $40_{-n}$) converts the analog signal (pixel signal) output from each of the unit pixels 20 in the pixel column in the pixel array unit 11, into a digital signal.

The reference signal generating unit 14 generates a reference signal $V_{ref}$ of a so-called ramp waveform having a voltage value varying stepwise as time passes (a slope waveform), as a criterial signal used for the A/D conversion. The reference signal generating unit 14 can be achieved with, for example, a digital-analog conversion (DAC) circuit. Note that, the reference signal generating unit 14 is not limited to including the DAC circuit.

Under the control of the timing control unit 19, the reference signal generating unit 14 generates the reference signal $V_{ref}$ of the ramp wave as the criterial signal, on the basis of a clock CK given from the timing control unit 19. Then, the reference signal generating unit 14 supplies the reference signal $V_{ref}$ that has been generated, to the A/D converters $40_{-1}$ to $40_{-n}$ in the column processing unit 13.

Each of the A/D converters $40_{-1}$ to $40_{-n}$ has the same configuration. Here, the configuration of the A/D converter $40_{-n}$ in the n-th column, will be exemplarily schematically described. The A/D converter $40_{-n}$ has a single-slope-type A/D converter configuration including a comparator 41, an up/down counter (as indicated with "U/DCNT" in the FIG. 42 being part of a counting unit, and a latch circuit 43.

The comparator 41 compares a signal voltage $V_{out}$ of the column signal line $32_{-n}$, corresponding to the pixel signal output from each of the unit pixels 20 in the n-th column in the pixel array unit 11, as a comparative input, to the reference signal $V_{ref}$ of the ramp wave supplied from the reference signal generating unit 14, as a criterial input. Then, for example, the comparator 41 brings an output $V_{co}$ into a first state (e.g., a high level) when the reference signal $V_{ref}$ is larger than the signal voltage $V_{out}$, and brings the output $V_{co}$ into a second state (e.g., a low level) when the reference signal $V_{ref}$ is the signal voltage $V_{out}$ or less. The configuration of the comparator 41 will be described in detail later.

The timing control unit 19 supplies the clock (counter clock) CK to the up/down counter 42 at the same timing as the reference signal generating unit 14. This arrangement allows the up/down counter 42 to perform counting down or counting up in synchronization with the clock CK, to measure the comparison period from the start of the comparing operation until the finish of the comparing operation in the comparator 41. Under the control of the timing control unit 19, the latch circuit 43 latches, at the point in time when the up/down counter 42 completes the counting operation to the unit pixel 20 in a pixel row, the counted result of the up/down counter 42 (counter output).

In this manner, the comparators 41 in the A/D converters $40_{-1}$ to $40_{-n}$ first perform the comparing operation on the analog signals supplied, in units of the pixel columns, from the unit pixels 20 in the pixel array unit 11 through the column signal lines $32_{-1}$ to $32_{-n}$. Then, each of the up/down counters 42 performs the counting operation over the period from the start of the comparing operation until the finish of the comparing operation of the comparator 41. After that, the analog signals are converted into digital data and the digital data is stored in the latch circuit 43.

The column scanning unit 15 includes a shift register, an address decoder and the like, and controls column addressing or column scanning to the A/D converters $40_{-1}$ to $40_{-n}$ in the column processing unit 13. Under the control of the column scanning unit 15, the digital data having the A/D conversion performed by the A/D converters $40_{-1}$ to $40_{-n}$, being latched by the respective latch circuits 43 of the A/D converters $40_{-1}$ to $40_{-n}$, is sequentially read into the horizontal output line 16 and the digital data is horizontally transferred to the video signal processing unit 17 through the horizontal output line 16.

The video signal processing unit 17 performs predetermined signal processing to the digital data (video signal) read and transferred from the respective latch circuits 43 of the A/D converters $40_{-1}$ to $40_{-n}$, and outputs the digital data as image pickup data externally from the chip (the semiconductor substrate) 30 through an output terminal 33. Under the control of the timing control unit 19, the output control unit 18 performs timing control to the column scanning unit 15 and the video signal processing unit 17 included in a data output unit, namely, performs timing control to the digital data horizontal transfer of the column scanning unit 15 and the signal processing of the video signal processing unit 17. Specifically, the output control unit 18 gives, for example, a horizontal transfer start signal and a horizontal transfer clock $H_{CLK}$ to the column scanning unit 15. The timing control of the timing control unit 19 will be described in detail later.

In the parallel-columned-A/DC-equipped CMOS image sensor 10, an analog circuit unit includes the pixel array unit 11 and the column processing unit 13 (practically, up to the respective up/down counters 42 of the A/D converters $40_{-1}$ to $40_{-n}$). In addition, a digital circuit unit includes the column scanning unit 15 and the video signal processing unit 17. That is, the present CMOS image sensor 10 includes the analog circuit unit and the digital circuit unit mounted together on the same chip (the semiconductor substrate) 30.

Note that, for the CMOS image sensor 10, the example in which the column processing unit 13 includes the A/D converters 40 provided corresponding to the column signal lines 32 (the pixel columns) one by one, has been given, but the configuration is not limited to the arrangement in the one-by-one correspondence. For example, one A/D converter 40 may be used between a plurality of pixel columns in a time-division manner, the one A/D converter 40 being shared between the plurality of pixel columns, for a configuration.

[Circuit Configuration of Unit Pixel]

Figure 2:
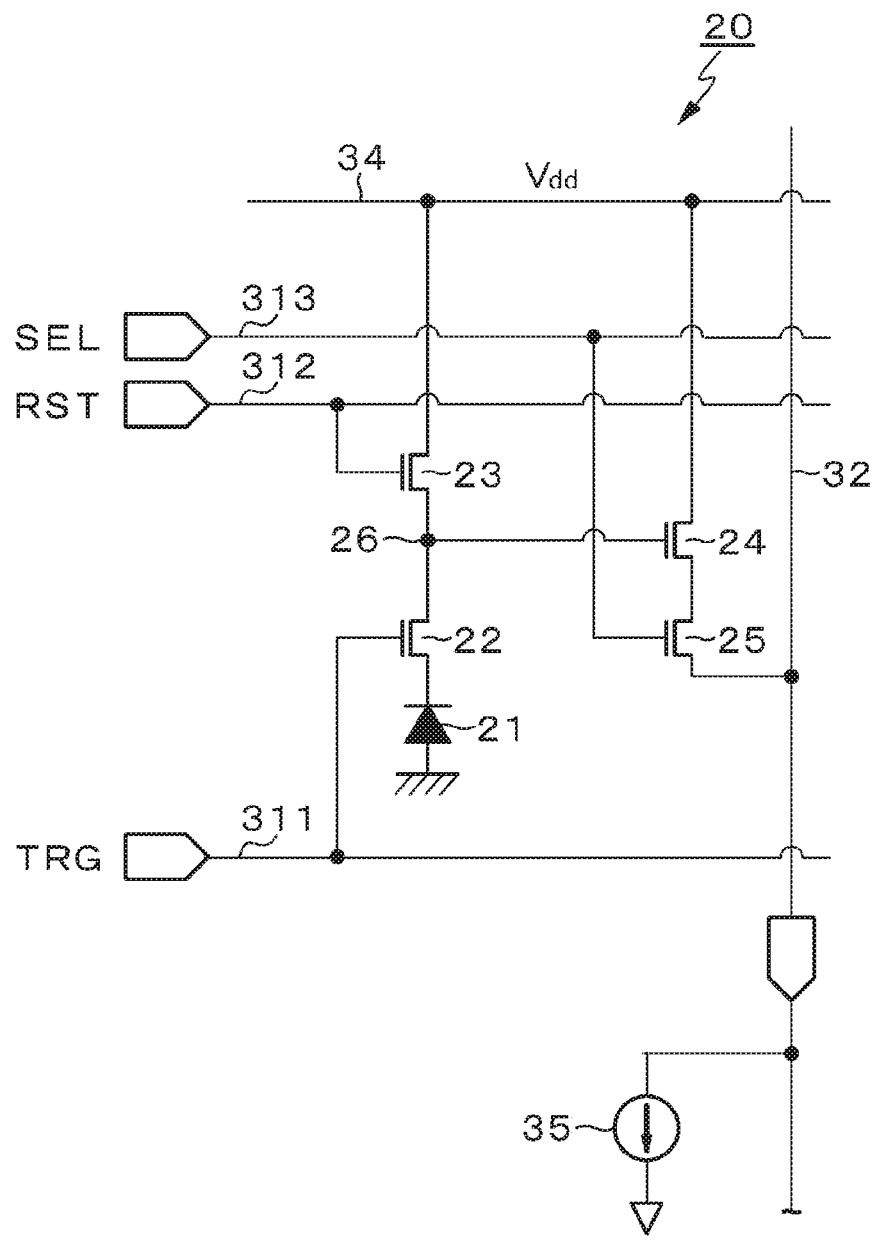
FIG. 2 is a circuit diagram illustrating an exemplary circuit configuration of a unit pixel.

FIG. 2 is a circuit diagram illustrating an exemplary circuit configuration of a unit pixel 20. As illustrated in FIG. 2, the unit pixel 20 according to the present example includes, for example, a photodiode (PD) 21 as the photoelectric conversion element. The unit pixel 20 includes, for example, a transfer transistor 22, a reset transistor 23, an amplification transistor 24, and a selection transistor 25, in addition to the photodiode 21.

Note that, here, four transistors of the transfer transistor 22, the reset transistor 23, the amplification transistor 24, and the selection transistor 25, each of which includes, for example, an N-type MOSFET. Note that, a combination of the conductivity types of the four transistors 22 to 25 is just exemplary, and the unit pixel 20 is not limited to this combination.

A plurality of control lines 311, 312, and 313 is wired, for each of the row control lines 31 ($31_{-1}$ to $31_{-m}$) described above, to the unit pixel 20 and the other pixels in the same pixel row, uniformly. The plurality of control lines 311, 312, and 313 is connected to the output end corresponding to the pixel row, in the row scanning unit 12. The row scanning unit 12 appropriately outputs a transfer signal TRG, a reset signal RST, and a selection signal SEL to the plurality of control lines 311, 312, and 313.

The photodiode 21 includes an anode electrode connected to a low-potential-side power source (e.g., a ground), and photoelectrically converts received light into an electric charge amount of photocharge (here, photoelectrons) corresponding to the amount of the received light, and accumulates the photocharge. The cathode electrode of the photodiode 21 is electrically connected to the gate electrode of the amplification transistor 24 through the transfer transistor 22. The region electrically connected to the gate electrode of the amplification transistor 24 is an electric charge detection part 26 that converts electric charge into voltage. Hereinafter, the electric charge detection part 26 is referred to as a floating diffusion (FD/floating diffusion region/impurity diffusion region) part 26.

The transfer transistor 22 is connected between the cathode electrode of the photodiode 21 and the FD part 26. The row scanning unit 12 gives the transfer signal TRG in which a high level (e.g., a $V_{dd}$ level) is active (hereinafter, referred to as "High active"), to the gate electrode of the transfer transistor 22 through the control line 311. The transfer transistor 22 is made into conduction in response to the transfer signal TRG, to transfer the photocharge photoelectrically converted and accumulated by the photodiode 21, to the FD part 26.

The reset transistor 23 includes a drain electrode connected to a power source line 34 with a voltage $V_{dd}$ and a source electrode connected to the FD part 26. The row scanning unit 12 gives the High active reset signal RST to the gate electrode of the reset transistor 23 through the control line 312. The reset transistor 23 is made into conduction in response to the reset signal RST, and discharges the electric charge in the FD part 26 into the power source line 34 to reset the FD part 26.

The amplification transistor 24 includes a gate electrode connected to the FD part 26 and a drain electrode connected to the power source line 34. The amplification transistor 24 acts as an input unit of a source follower being a reading circuit that reads a signal acquired by the photoelectric conversion of the photodiode 21. That is, the source follower includes the source electrode of the amplification transistor 24 connected to the column signal line 32 through the selection transistor 25, and a current source 35 connected to one end of the column signal line 32.

The selection transistor 25 includes, for example, a drain electrode connected to the source electrode of the amplification transistor 24 and a source electrode connected to the column signal line 32. The row scanning unit 12 gives the High active selection signal SEL to the gate electrode of the selection transistor 25 through the control line 313. The selection transistor 25 is made in conduction in response to the selection signal SEL, and transmits a signal output from the amplification transistor 24 to the column signal line 32, with the unit pixel 20 selected.

Note that, the selection transistor 25 may be connected between the power source line 34 and the drain electrode of the amplification transistor 24, for a circuit configuration. In addition, according to the present example, a 4Tr configuration including the transfer transistor 22, the reset transistor 23, the amplification transistor 24, and the selection transistor 25, namely, the four transistors (Tr), has been exemplified as a pixel circuit for the unit pixel 20, but the pixel circuit is not limited to this. For example, a 3Tr configuration, excluding the selection transistor 25 and including the amplification transistor 24 having the function of the selection transistor 25, can be provided, or a configuration including the number of transistors increased, as necessary, can be provided.

[Circuit Configuration of Comparator]

Figure 3A:
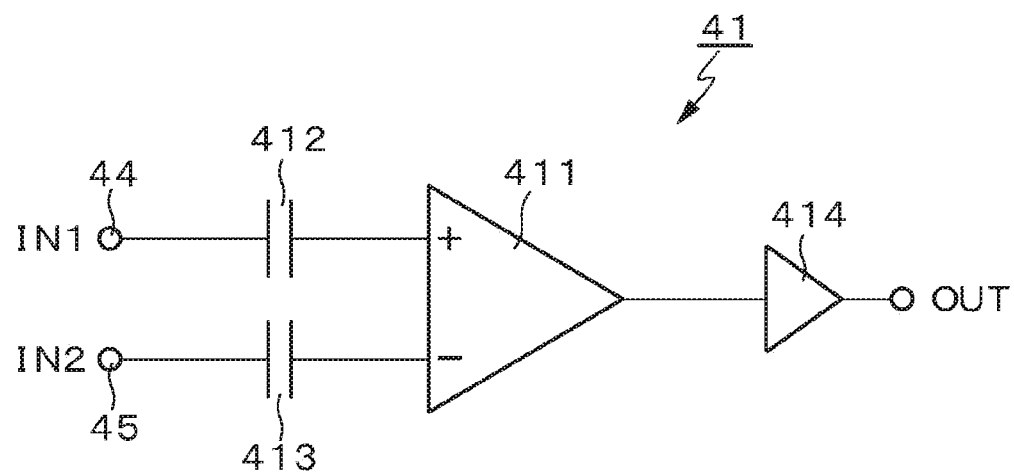
FIG. 3A is a block diagram illustrating an exemplary configuration of a comparator in a single-slope-type A/D converter.

Next, the specific circuit configuration of the comparator 41 in each of the single-slope-type A/D converters 40, will be described. FIG. 3A illustrates an exemplary configuration of the comparator 41 in a single-slope-type A/D converter 40.

The comparator 41 according to the present example includes a voltage-current conversion amplifier 411, and includes sampling capacitors 412 and 413 connected between two input terminals 44 and 45 and the non-inverting (+) input end and the inverting (−) input end of the voltage-current conversion amplifier 411, respectively. An amplifier 414 is arranged at the subsequent stage of the voltage-current conversion amplifier 411.

In correspondence to the comparators 41 in the single-slope-type A/D converters 40 illustrated in FIG. 1, the reference signal $V_{ref}$ generated by the reference signal generating unit 14 is supplied as an input signal IN1 to the one input terminal 44. In addition, the pixel signal read from each of the unit pixels 20 is supplied to the other input terminal 45 through the column signal line 32.

Figure 3B:
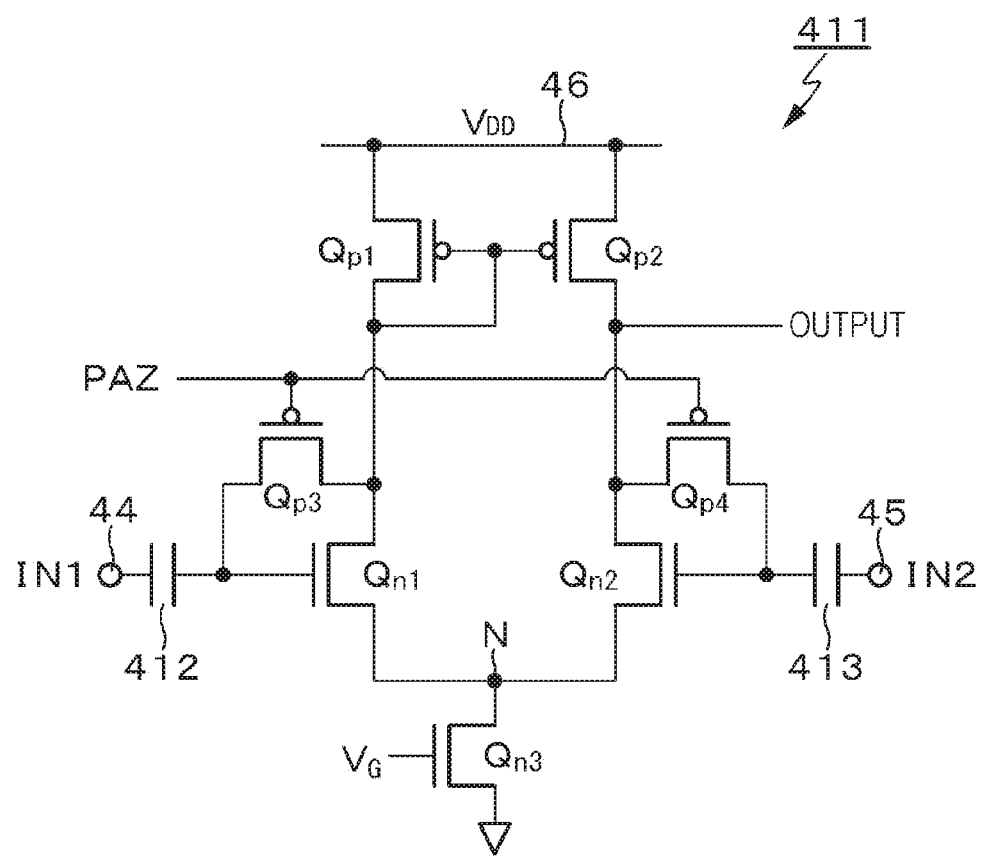
FIG. 3B is a circuit diagram illustrating an exemplary partial circuit configuration of the comparator.

FIG. 3B illustrates an exemplary partial circuit configuration of the comparator 41. The comparator 41 includes differential paired transistors $Q_{n1}$ and $Q_{n2}$, each of which including an N-type MOSFET, the common source connection node N of the differential paired transistors $Q_{n1}$ and $Q_{n2}$ being connected to the low-potential-side power source through a current source transistor $Q_{n3}$. A bias voltage $V_G$ is applied to the gate electrode of the current source transistor $Q_{n3}$.

P-type MOS transistors $Q_{p1}$ and $Q_{p2}$ included in a current mirror circuit, are provided on the side of the high-potential-side power source of the differential paired transistors $Q_{n1}$ and $Q_{n2}$ (on the side of a power source line 46 with a voltage $V_{DD}$). Then, P-type MOS transistors $Q_{p3}$ and $Q_{p4}$ respectively functioning as an auto zero switch, are connected between the gate electrodes and drain electrodes of the N-type MOS transistors $Q_{n1}$ and $Q_{n2}$, respectively.

A reset signal PAZ of the comparator 41 is applied to each of the gate electrodes of the P-type MOS transistors $Q_{p3}$ and $Q_{p4}$. The application of the reset signal PAZ to the P-type MOS transistors $Q_{p3}$ and $Q_{p4}$, each of which functioning as the auto zero switch, allows the comparator 41 to perform an auto zero operation. Here, the "auto zero operation" is an initialization operation of determining an operating point of the comparator 41 for each pixel column, namely, a reset operation of determining a criterial level for the comparator 41.

[Basic Circuit Operation of CMOS Image Sensor]

Figure 4:
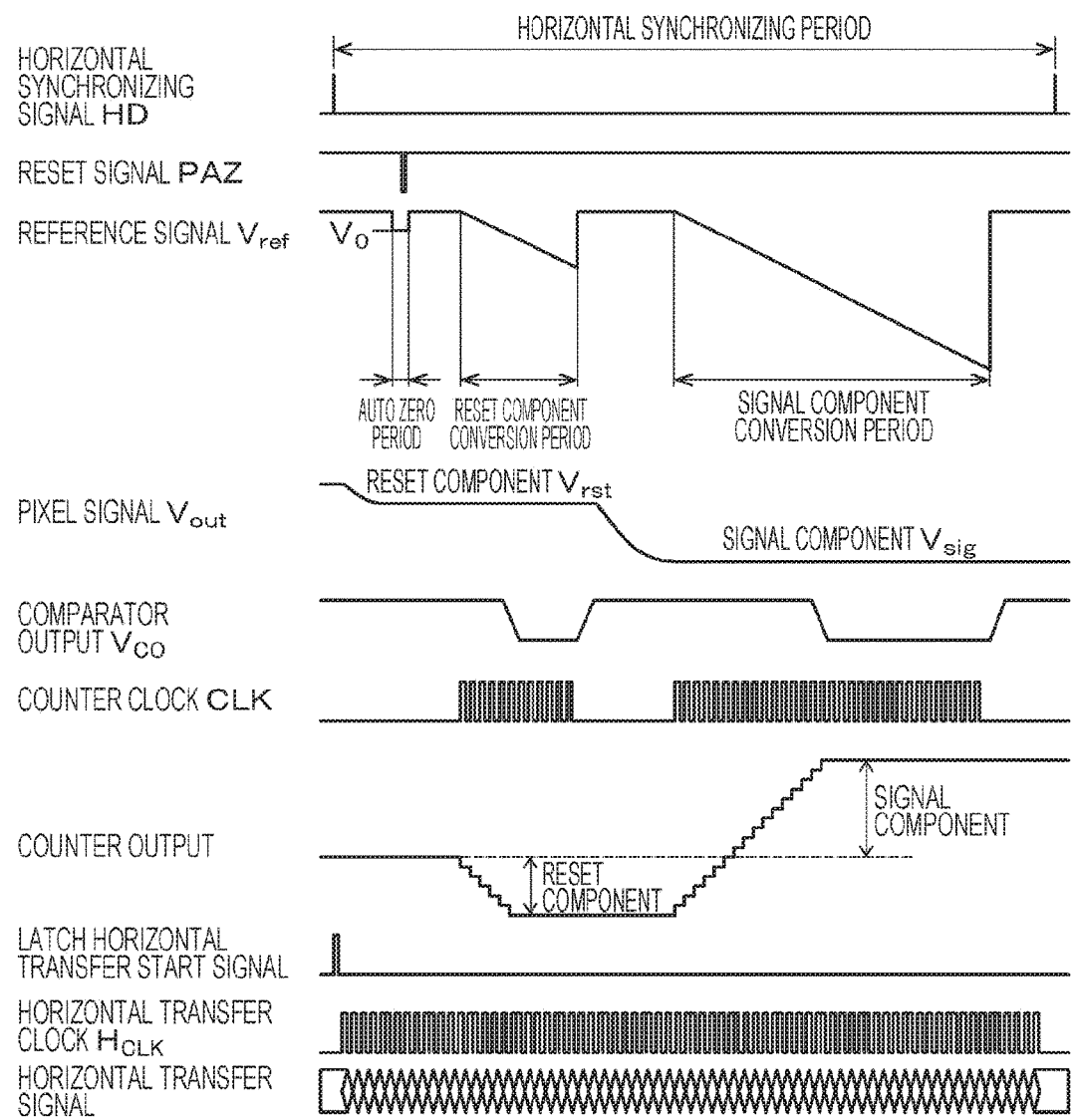
FIG. 4 is a timing waveform chart for describing the basic circuit operation of the CMOS image sensor.

The basic circuit operation of the CMOS image sensor 10 described above, will be described with a timing waveform chart of FIG. 4.

(CDS Processing)

The CMOS image sensor 10 performs processing of removing noise in the reset operation, specifically, noise removal processing with correlated double sampling (CDS). For example, a reset component $V_{rst}$ and a signal component $V_{sig}$ are sequentially read as the pixel signal on a time-series basis from each of the unit pixels 20. The reset component $V_{rst}$ corresponds to the potential of the FD part 26 in resetting the FD part 26 to the power source voltage $V_{dd}$. The signal component $V_{sig}$ corresponds to the potential of the FD part 26 in transferring the electronic charge accumulated in the photodiode 21 to the FD part 26.

In a method of reading the reset component $V_{rst}$ first, since the FD part 26 retains random noise generated in the resetting, the signal component $V_{sig}$ including the signal electric charge added, that has been read, retains the same amount of noise as the reset component $V_{rst}$ retains. Therefore, performing the correlated double sampling operation of subtracting the reset component $V_{rst}$ from the signal component $V_{sig}$, allows a signal having the noise removed, to be acquired. In addition, fixed pattern noise can be removed, such as deviation in the threshold value of the amplification transistor 24 used for reading the signal.

The operation of the CDS processing will be specifically described below. Each of the unit pixels 20 first outputs the reset component $V_{rst}$ by the scanning of the row scanning unit 12, at the start of a horizontal synchronizing period being the period of one cycle of the horizontal synchronizing signal HD. In addition, the reference signal generating unit 14 outputs a voltage $V_0$ for resetting the comparator 41. Then, the timing control unit 19 outputs the reset signal PAZ at the timing at which the voltage $V_0$ output by the reference signal generating unit 14 stabilizes, and then the comparator 41 performs the auto zero operation of determining the criterial level (the reset operation) in response to the reset signal PAZ.

After that, the timing control unit 19 inputs the counter clock CK into the up/down counter 42, and simultaneously the reference signal generating unit 14 inputs the slope reference signal $V_{ref}$ into the comparator 41. The up/down counter 42 first performs the counting down operation with the input of the counter clock CK. The comparator 41 compares the slope reference signal $V_{ref}$ and the reset component $V_{rst}$ from the unit pixel 20, on the basis of the voltage in the auto zero operation, to change the logic of the comparator output $V_{co}$ at the timing at which the two agree with each other. The up/down counter 42 stops the counting down operation in response to the change of the logic of the comparator output $V_{co}$. The output of the up/down counter 42 (counter output) results in the value of the reset component $V_{rst}$ having the A/D conversion performed.

After that, the unit pixel 20 outputs the signal component $V_{sig}$ by the scanning of the row scanning unit 12. At this time, the output of the reference signal generating unit 14 returns to the initial voltage level in performing the A/D conversion to the reset component $V_{rst}$. Then, at the timing at which the outputs stabilize, the timing control unit 19 inputs the counter clock CK into the up/down counter 42 and simultaneously the reference signal generating unit 14 inputs the slope reference signal $V_{ref}$ into the comparator 41.

The up/down counter 42 performs the counting up operation with the input of the counter clock CK. Under the control of the timing control unit 19, the up/down counter 42 performs the switching between the counting down operation and the counting up operation. The comparator 41 compares the slope reference signal $V_{ref}$ and the signal component $V_{sig}$ from the unit pixel 20, to change the logic of the comparator output $V_{co}$ at the timing at which the two agree with each other. The up/down counter 42 stops the counting up operation in response to the change of the logic of the comparator output $V_{co}$. At this time, the counter output results in the value of the signal component $V_{sig}$ having the A/D conversion performed.

As described above, the column processing unit 13 performs the CDS processing in the A/D conversion processing. That is, the up/down counter 42 is used as a unit that measures the comparing period from the start to the finish in the comparing operation of the comparator 41. Then, for the reset component $V_{rst}$ and the signal component $V_{sig}$ read on the time-series basis from the unit pixel 20, the up/down counter 42 performs, for example, the counting down to the reset component $V_{rst}$ and the counting up to the signal component $V_{sig}$ in the measuring operation. The counting down operation and the up down operation can acquire the difference between the signal component $V_{sig}$ and the reset component $V_{rst}$. As a result, the column processing unit 13 performs the noise removal with the CDS processing in the A/D conversion processing.

(Pipeline Operation)

The CMOS image sensor 10 further performs a pipeline operation with the A/D converters 40 ($40_{-1}$ to $40_{-n}$), each of which is equipped with the latch circuit 43. Here, the "pipeline operation" includes performing the signal reading and the A/D conversion processing in the analog circuit unit and performing the signal output processing in the digital circuit unit in parallel. That is, in the pipeline operation, a series of the reading operation of reading the pixel signals in a pixel row and performing the A/D conversion is performed in parallel with (simultaneously with) the operation of outputting the image data after the A/D conversion processing to the previous pixel row of the pixel row (the horizontal transfer operation).

Specifically, the timing control unit 19 inputs a latch horizontal transfer start signal into the respective latch circuits 43 of the A/D converters 40 ($40_{-1}$ to $40_{-n}$) at the start of the horizontal synchronizing period. Each of the latch circuits 43 latches the counter output of the up/down counter 42 in response to the latch horizontal transfer start signal. After that, the output control unit 18 supplies the horizontal transfer clock $H_{CLK}$ to the column scanning unit 15 and the video signal processing unit 17. With the input of the horizontal transfer clock $H_{CLK}$, the column scanning unit 15 sequentially selects the respective latch circuits 43 of the pixel columns, and reads data latched in the latch circuits 43 into the horizontal output line 16. In addition, the video signal processing unit 17 performs the signal processing to the data read into the horizontal output line 16, and outputs the data externally from the chip 30.

In this manner, the pipeline operation of performing the signal output (the horizontal transfer) after the A/D conversion processing of the previous pixel row of a pixel row, simultaneously, during reading the pixel signals in the pixel row and performing the A/D conversion processing, allows the horizontal synchronizing period being the criterion for the operation timing, to be hardly occupied with the signal output and to be allocated to the reading operation. A CMOS image sensor responding to a high frame rate of image signal, has the horizontal synchronizing period short, and thus the pipeline operation is highly required. In other words, the CMOS image sensor 10 that performs the pipeline operation can achieve a high frame rate and a multilevel gradation of A/D conversion.

Here, in a case where the analog circuit unit and the digital circuit unit are mounted together on the same chip 30, digital noise arising from, for example, a variation in potential between the power source and the ground in the circuit operation of the digital circuit unit, exerts an adverse effect on the circuit operation of the analog circuit unit, resulting in degradation in image quality. In order to avoid this, in a case where the digital circuit unit is configured to operate in a horizontal blanking period during which the signal reading is not performed (e.g., Patent Document 1), the digital circuit unit has difficulty in operating in the horizontal blanking period because the horizontal blanking period shortens as the horizontal synchronizing period shortens.

Therefore, the present disclosure is to propose the technology allowing the degradation in image quality arising from the digital noise, to be avoided even when the horizontal blanking period shortens as the horizontal synchronizing period shortens under the control of the output control unit 18 (refer to FIG. 1), namely, regardless of the length of the horizontal blanking period. The technology according to the present disclosure will be specifically described below.

<First Embodiment>

According to a first embodiment, with control of a clock being a criterion for the operation of the digital circuit unit including the column scanning unit 15 and the video signal processing unit 17, specifically, the speed (frequency) of the horizontal transfer clock $H_{CLK}$, the digital circuit unit performs the processing over the period from a processing start timing to a processing finish timing in the analog circuit unit. The output control unit 18 performs the control.

Specifically, the output control unit 18 controls the speed (frequency) of the horizontal transfer clock $H_{CLK}$ to be reduced, favorably, to be uniformly reduced, in order for the digital circuit unit not to finish the signal output (the horizontal transfer) during the operating period of the analog circuit unit that performs the reading and the A/D conversion in the horizontal synchronizing period. Here, the "reducing the speed of the horizontal transfer clock $H_{CLK}$" means that decelerating the speed of the horizontal transfer clock $H_{CLK}$ in comparison to a case where the present technique is not adopted.

Figure 5:
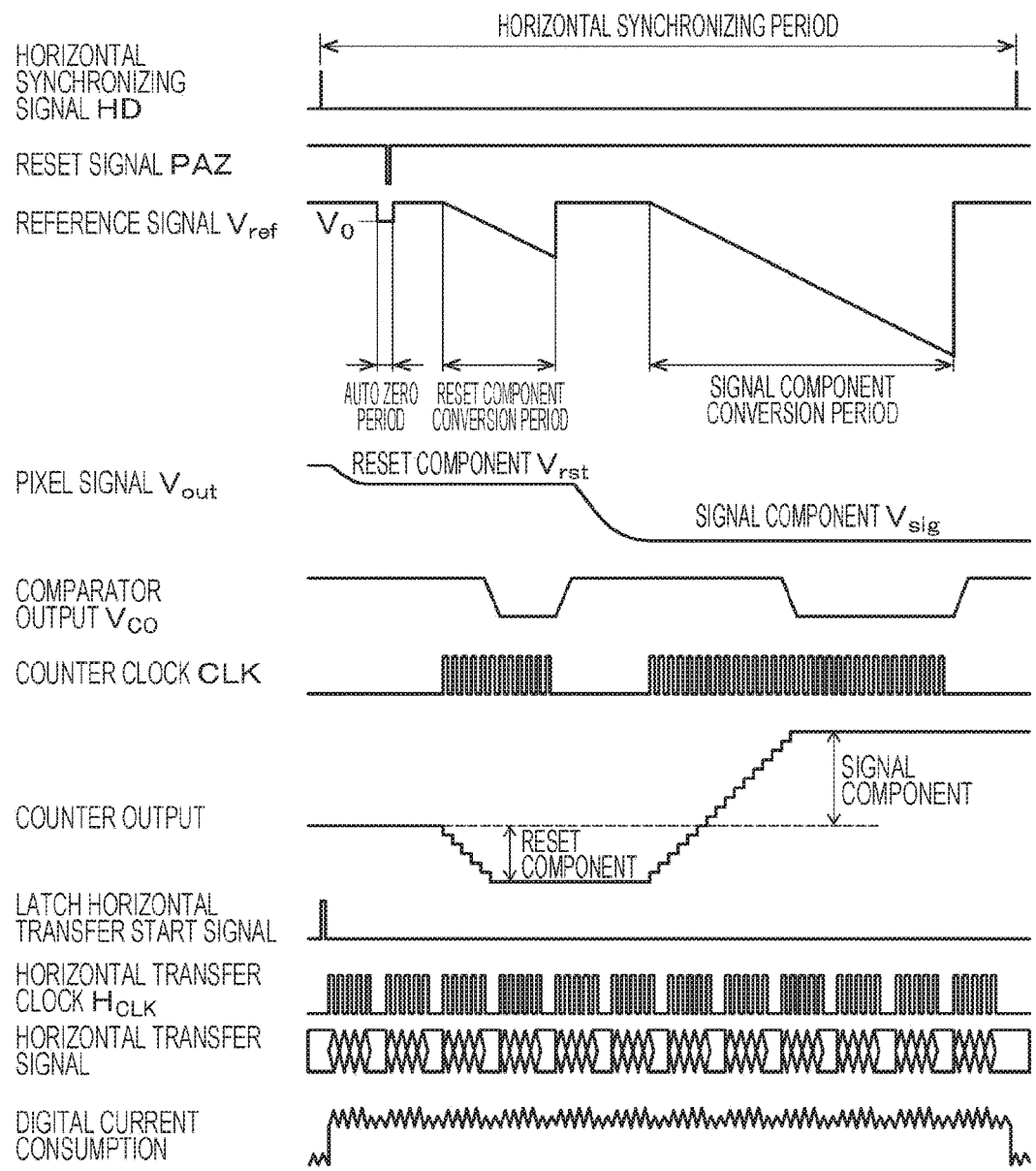
FIG. 5 is a timing waveform chart for describing a circuit operation according to a first embodiment.

FIG. 5 is a timing waveform chart for describing the circuit operation according to the first embodiment. In the example of FIG. 5, the horizontal transfer clock $H_{CLK}$ is intermittently decimated such that the frequency of the horizontal transfer clock $H_{CLK}$ is uniformly reduced. Note that, the technique of reducing the frequency of the horizontal transfer clock $H_{CLK}$ is not limited to the intermittent decimation, and thus the horizontal transfer clock $H_{CLK}$ may be uniformly decimated over the entire horizontal synchronizing period.

For the decimation of the horizontal transfer clock $H_{CLK}$, frequency dividing may be performed at a frequency dividing rate not being an integer rate, with a clock frequency divider, such as a phase locked loop (PLL) circuit, to cover the A/D conversion period. In addition, frequency setting may be made such that the horizontal transfer clock $H_{CLK}$ is allocated to the horizontal transfer over the entire horizontal synchronizing period, in addition to the A/D conversion period.

As described above, the digital circuit unit performs the processing over the period from the processing start timing to the processing finish timing in the analog circuit unit, so that a large variation in current consumption due to the operation of the digital circuit unit does not occur during the reading period of each of the pixel signals. Then, the digital circuit unit is not to perform the processing in the horizontal blanking period, and thus the degradation in image quality arising from the digital noise generated by, for example, the variation in potential between the power source and the ground in the circuit operation of the digital circuit unit can be avoided regardless of the length of the horizontal blanking period. In addition, the speed of the horizontal transfer clock $H_{CLK}$ is reduced in comparison to the case where the present technique is not adopted, so that there is no increase in power consumption.

In the digital circuit unit including the column scanning unit 15 and the video signal processing unit 17, the digital circuit unit operates less in the period during which no horizontal transfer clock $H_{CLK}$ is present before the start of the horizontal transfer or after the finish of the horizontal transfer, and thus the current consumption is small and the power consumption is generated by the amount of the operation during the horizontal transfer. In addition, the decimation of the horizontal transfer clock $H_{CLK}$, causes the current consumption to be reduced by the amount of the decimation, but the power consumption is not reduced up to that when the horizontal transfer clock $H_{CLK}$ stops completely, due to, for example, the ratio between a region to be active and a region to be inactive in practice or the time constant of the power source line of the chip 30, in a case where the digital circuit unit has a large scale and the period during which the clock is decimated is short.

Specifically, a digital current consumption image as illustrated in FIG. 5 is acquired, and thus no large variation occurs in the power consumption. In the CMOS image sensor 10 including the analog circuit unit and the digital circuit unit mounted together on the chip 30, more or less, the variation in the power consumption of the digital circuit unit, mixes into the analog circuit unit through the power source line or signal lines of the digital circuit unit. Then, a small variation in the power consumption in the digital circuit unit shows that the variation of a noise component to mix into the analog circuit unit, is small.

For the A/D conversion according to the present embodiment, the criterial level for each of the comparators 41 in a horizontal synchronizing period is adjusted during an auto zero period; the A/D conversion of the reset component $V_{rst}$ is performed during a reset component conversion period; and the A/D conversion of the signal component $V_{sig}$ is performed during a signal component conversion period. If a large variation occurs in the current consumption of the digital circuit unit during the auto zero period and, for example, the variation in potential between the power source and the ground due to the large variation mixes into the analog circuit unit, the criterial level for each of the comparator 41 is not correctly set. Then, the incorrect setting of the criterial level for each of the comparators 41 results in, for example, deviation of a criterial level, such as a black level, or degradation of the linearity of an output signal to an input signal.

The auto zero operations are performed, at the same timing, to the columns (the pixel columns) in parallel. Here, in a case where deviation between the threshold values of the transistors included in the comparators 41 is present or non-uniformity in the propagation time of the variation in potential between the power source and the ground is present, non-uniformity occurs in the setting of the criterial level by the auto zero operation for each pixel column. Then, the non-uniformity in the criterial level setting causes longitudinal-stripes-like degradation in image quality or horizontal-shading-like degradation in image quality.

In addition, in a case where the variation in the current consumption mixes at a certain timing in the reset component $V_{rst}$ or the signal component $V_{sig}$, the correlated double sampling operation does not work, and thus degradation in image quality occurs such that the reset noise remains or discontinuity occurs in the brightness level of a signal. In contrast to this, according to the present embodiment, a large variation in the current consumption due to the operation of the digital circuit unit does not occur during the reading period of each pixel signal (the reset component $V_{rst}$/the signal component $V_{sig}$), and thus the faults can be reduced.

<Second Embodiment>

As described in the first embodiment, if the large variation in the current consumption occurs during the auto zero period (a reset period) during which the criterial level for each of the comparators 41 is determined, during the reset component conversion period during which the A/D conversion of the reset component $V_{rst}$ is performed, or during the signal component conversion period during which the A/D conversion of the signal component $V_{sig}$ is performed, the degradation in image quality is caused. Therefore, according to a second embodiment, the horizontal transfer clock $H_{CLK}$ is supplied to the digital circuit unit during at least one of the auto zero period and the pixel signal A/D conversion period (the reset component conversion period and the signal component conversion period), relating to the degradation in image quality. The output control unit 18 performs the control.

In this manner, the horizontal transfer clock $H_{CLK}$ is supplied to the digital circuit unit during the at least one of the auto zero period and the pixel signal A/D conversion period (the reset component conversion period and the signal component conversion period) and the horizontal transfer (the signal output) is completed, so that the following function and effect can be acquired. That is, the large variation in the current consumption generated in the start or finish of the operation of the digital circuit unit, does not occur during the period during which the horizontal transfer is performed, so that the degradation in image quality arising from the digital noise generated by, for example, the variation in potential between the power source and the ground in the circuit operation of the digital circuit unit can be avoided. In addition, the horizontal transfer clock $H_{CLK}$ is not supplied to the digital circuit unit during the other periods except the period during which the horizontal transfer is performed, so that there is no increase in the power consumption. Specific examples according to the second embodiment will be described below.

EXAMPLE 1

Figure 6:
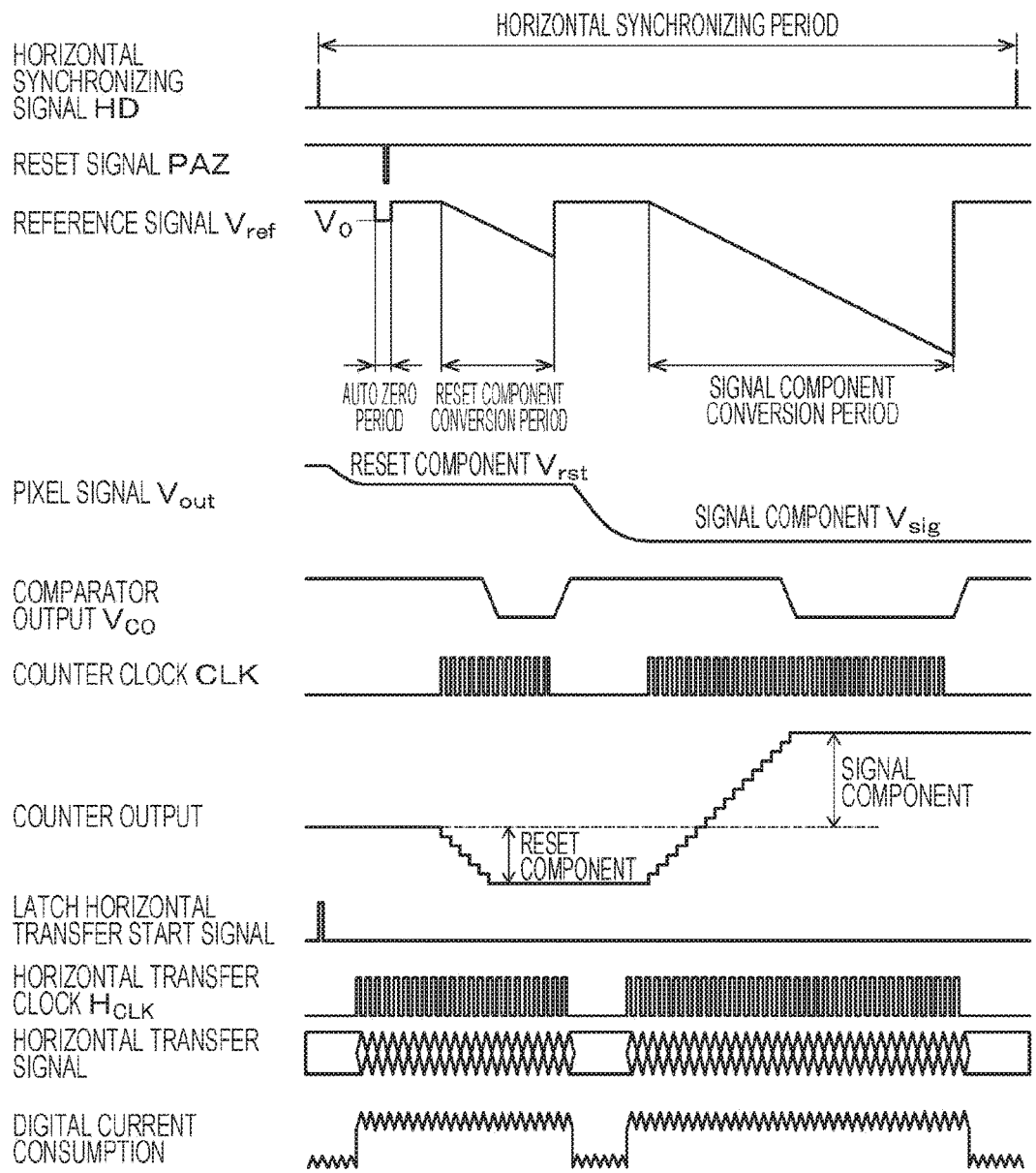
FIG. 6 is a timing waveform chart for describing a circuit operation according to Example 1 of a second embodiment.

According to Example 1, the horizontal transfer clock $H_{CLK}$ is supplied to the digital circuit unit during the auto zero period, the reset component conversion period, and the signal component conversion period, relating to the degradation in image quality, and the horizontal transfer clock $H_{CLK}$ is not supplied to the digital circuit unit during the other periods. The output control unit 18 performs the control. FIG. 6 is a timing waveform chart for describing a circuit operation according to Example 1.

In this manner, the horizontal transfer clock $H_{CLK}$ is supplied to the digital circuit unit during the auto zero period, the reset component conversion period, and the signal component conversion period, and the horizontal transfer is completed during the periods, so that the large variation in the current consumption generated in the start or finish of the operation of the digital circuit unit, does not occur during the periods. As a result, the degradation in image quality arising from the digital noise generated by, for example, the variation in potential between the power source and the ground in the circuit operation of the digital circuit unit can be avoided. In addition, except the auto zero period, the reset component conversion period, and the signal component conversion period, the horizontal transfer clock $H_{CLK}$ is not supplied to the digital circuit unit, so that there is no increase in the power consumption.

In a case where A/D conversion modes for a plurality of gradations are provided, the respective A/D conversion timings of the modes are different from each other. In that case, a combination of the control of the clock decimation according to Example 1 and the control of performing the horizontal transfer during the periods being the point according to Example 2, namely, the auto zero period, the reset component conversion period, and the signal component conversion period, may be performed to each of the A/D conversion modes. In addition, control may be performed in order to cover any part of the auto zero period, the reset component conversion period, and the signal component conversion period, in response to a signal quantity to be horizontally transferred. In this manner, flexibly selecting the speed (frequency) of the horizontal transfer clock $H_{CLK}$ and the period during which the horizontal transfer is performed, in response to the A/D conversion modes, can support the A/D conversion timings for the plurality of gradations.

EXAMPLE 2

Figure 7:
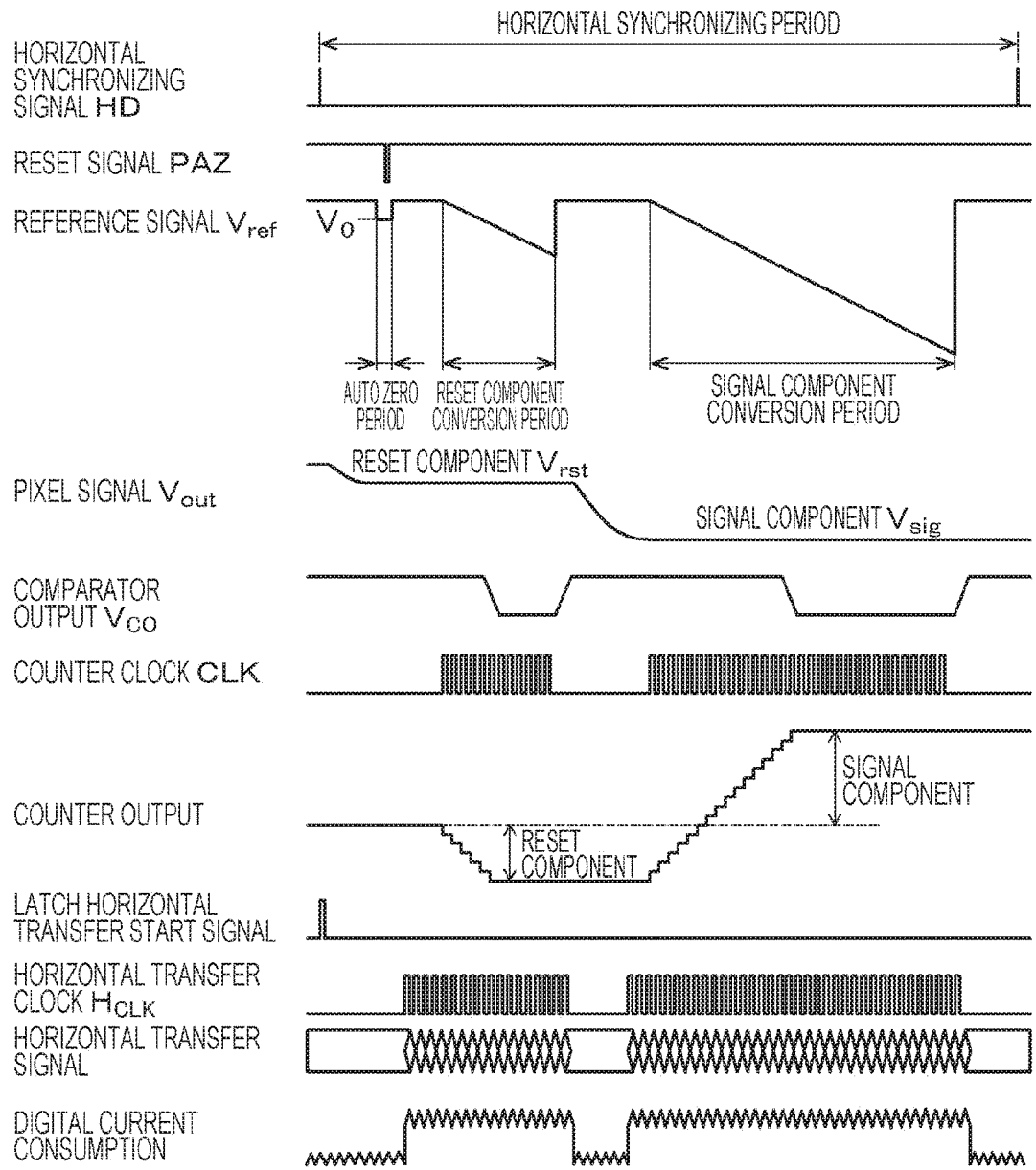
FIG. 7 is a timing waveform chart for describing a circuit operation according to Example 2 of the second embodiment.

Example 2 is a modification of Example 1. According to Example 1, the horizontal transfer clock $H_{CLK}$ is supplied to the digital circuit unit during the entire period of the auto zero period, the reset component conversion period, and the signal component conversion period, and the horizontal transfer (the signal output) is completed during the periods. In contrast to this, the present example is for a clock frequency or a horizontal transfer quantity with which the horizontal transfer is competed during the reset component conversion period and the signal component conversion period. That is, according to Example 2, the auto zero period is excluded from the period during which the horizontal transfer is performed. The output control unit 18 performs the control. FIG. 7 is a timing waveform chart for describing a circuit operation according to Example 2.

The auto zero period is an important period for determining the criterial level for each of the comparators 41. Therefore, in a case where the auto zero period can be excluded from the period during which the horizontal transfer is performed, the auto zero period is desirably excluded preferentially. In this manner, excluding the auto zero period from the period during which the horizontal transfer is performed can prevent the auto zero operation from the influence of the digital noise, so that the operation of determining the criterial level for each of the comparators 41 can be certainly performed.

EXAMPLE 3

Figure 8:
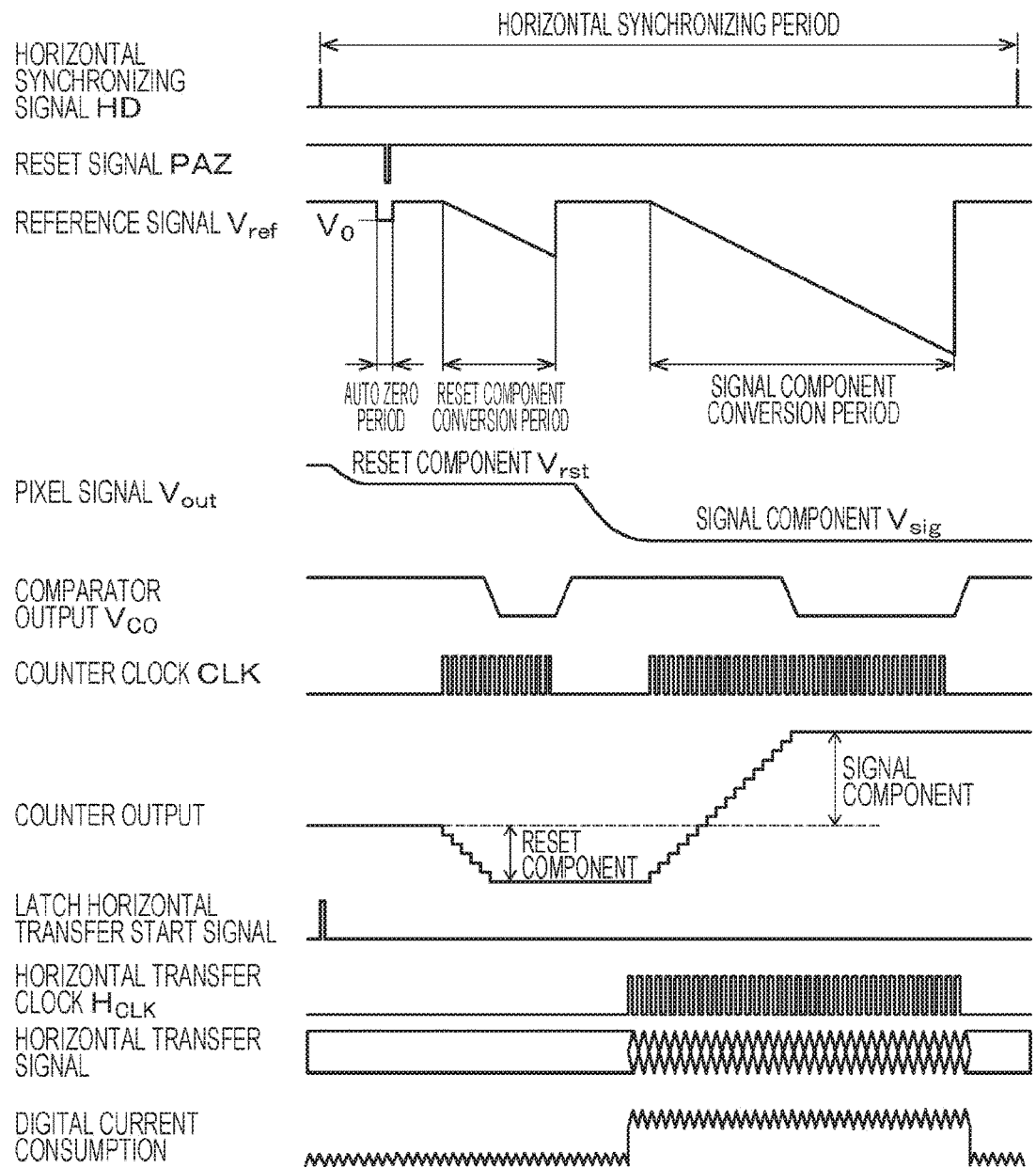
FIG. 8 is a timing waveform chart for describing a circuit operation according to Example 3 of the second embodiment.

Example 3 is a modification of Example 2. According to Example 3, the auto zero period is excluded from the period during which the horizontal transfer is performed. In contrast to this, the present example is for a clock frequency or a horizontal transfer quantity with which the horizontal transfer is completed during the signal component conversion period. That is, according to Example 3, the reset component conversion period is also excluded from the period during which the horizontal transfer is performed, in addition to the auto zero period. The output control unit 18 performs the control. FIG. 8 is a timing waveform chart for describing a circuit operation according to Example 3.

According to the present example, the horizontal transfer is successively performed during the signal component conversion period, so that degradation in image quality, such as occurrence of discontinuity in the brightness level of a signal, can be avoided from occurring. However, the horizontal transfer is not performed during the reset component conversion period and a difference occurs in digital power consumption between the reset component conversion period and the signal component conversion period, so that the state between the power source and the ground, varies between the reset component conversion period and the signal component conversion period. The difference in the state between the power source and the ground, causes a DC error between the reset component conversion period and the signal component conversion period, so that black-deviation degradation in image quality occurs. Note that, if the deviation is over the entire screen, the deviation can be improved with, for example, black-level offset correction.

According to the present example, the reset component conversion period is excluded from the period during which the horizontal transfer is performed, but the signal component conversion period may be excluded in addition to the auto zero period. In this manner, even in a case where the horizontal transfer is performed during the reset component conversion period instead of the signal component conversion period, a function and an effect similar to those in the case where the horizontal transfer is performed during the signal component conversion period can be acquired.

EXAMPLE 4

Figure 9:
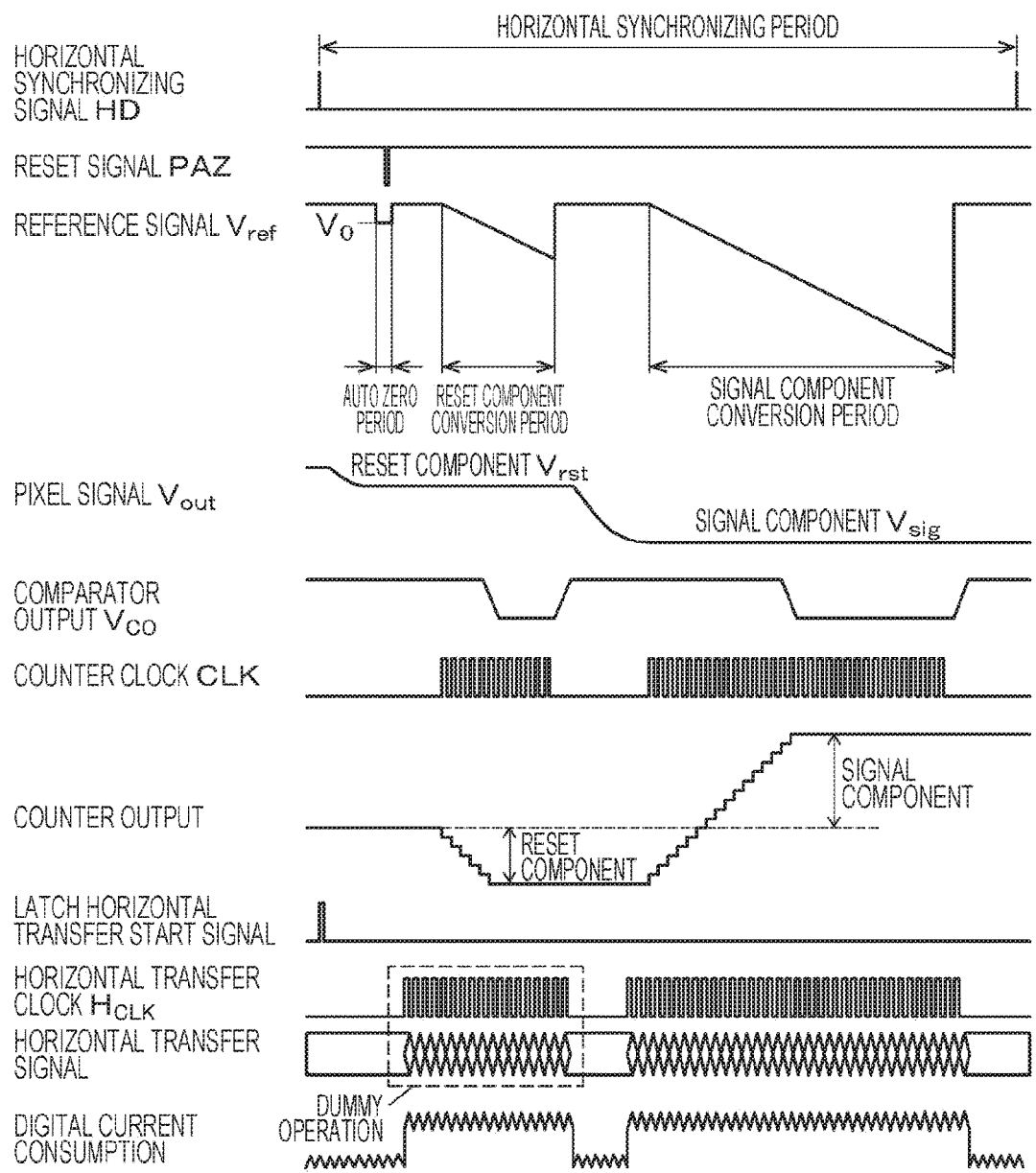
FIG. 9 is a timing waveform chart for describing a circuit operation according to Example 4 of the second embodiment.

Example 4 is a modification of Example 3. According to the present example, a dummy clock operation and digital operation are performed during the reset component conversion period, for the clock frequency or the horizontal transfer quantity with which the horizontal transfer is completed during the signal component conversion period according to Example 3. The output control unit 18 performs the control. FIG. 9 is a timing waveform chart for describing a circuit operation according to Example 4. Here, the "dummy clock operation" is an artificial operation of, instead of typically performing signal processing to a video output of an image pickup element to output, selectively generating power equivalent to the power consumption in that case, at a necessary timing. In the dummy clock operation, the column scanning unit 15 and the video signal processing unit 17 perform the horizontal transfer operation, similarly to in the typical operation, but the output terminal 33 is controlled not to output the signal externally from the chip 30.

According to Example 3, the black-level offset correction is required due to the difference in the power consumption of the digital circuit unit between the reset component conversion period and the signal component conversion period. In contrast to this, according to the present example, performing the dummy operation during the reset component conversion period, allows the state between the power source and the ground to be identical between the reset component conversion period and the signal component conversion period, so that the black deviation can be avoided with minimum power consumption.

According to the present example, in a case where the horizontal transfer is performed during the reset component conversion period instead of the signal component conversion period, the dummy clock operation and digital operation may be performed during the signal component conversion period. In this case, the state between the power source and the ground is allowed to be identical between the signal component conversion period and the reset component conversion period, so that the black deviation can be avoided with minimum power consumption.

<Modification>

As the CMOS image sensor 10 to which the first embodiment or the second embodiment is applied, the flatted structure illustrated in FIG. 1 has been exemplified above, but a layered structure may be provided. Here, the "flatted structure" refers to a structure that includes, as illustrated in FIG. 1, the peripheral circuit of the pixel array unit 11, namely, for example, the driving unit that drives each of the pixels 20 in the pixel array unit 11 and the signal processing unit that performs the predetermined signal processing to the signal read from each of the pixels 20, arranged on the same chip 30 as the pixel array unit 11 is arranged. In addition, the "layered structure" refers to a structure that includes the pixel array unit 11 and the peripheral circuit mounted on different chips layered.

In addition, as a pixel structure of receiving incident light on the CMOS image sensor 10, when the front is the side on which a wired-line layer is arranged, a front-irradiation-type pixel structure of receiving the incident light on the front side may be provided or a back-irradiation-type pixel structure of receiving the incident light on the back side (the side opposite to the side on which the wired-line layer is arranged) may be provided.

<Electronic Apparatus According to Present Disclosure>

The solid-state image pickup element (the CMOS image sensor), to which the technology according to the present disclosure is applied, can be used as an image pickup unit (an image capturing unit) for electronic apparatuses in general, for example, an image pickup device such as a digital still camera or a video camera, a portable terminal device having an image pickup function such as a portable phone, and a copying machine with an image reading unit including a solid-state image pickup element. Note that, a modular mode to be mounted on each of the electronic apparatuses, namely, a camera module is also regarded as an image pickup device.

[Image Pickup Device]

Figure 10:
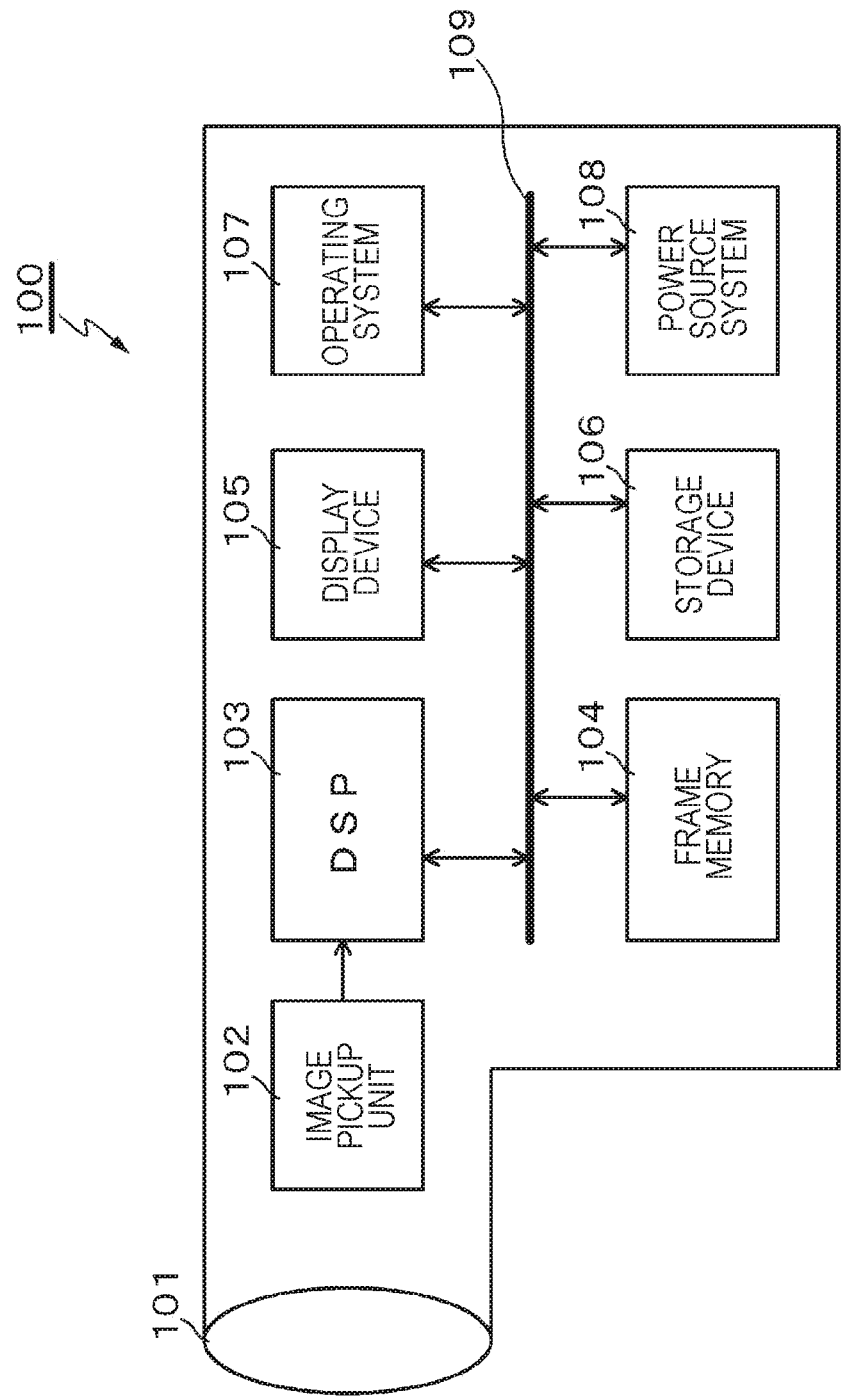
FIG. 10 is a system configuration diagram schematically illustrating the configuration of an electronic apparatus according to the present disclosure.

FIG. 10 is a system configuration diagram schematically illustrating the configuration of an electronic apparatus according to the present disclosure. Here, an image pickup device will be exemplarily described as the electronic apparatus according to the present disclosure.

As illustrated in FIG. 10, the image pickup device 100 being the exemplary electronic apparatus according to the present disclosure, includes an optical system 101 including a lens group and the like, an image pickup unit 102, a DSP circuit 103 being a camera signal processing unit, a frame memory 104, a display device 105, a recording device 106, an operating system 107, a power source system 108 and the like. Then, the DSP circuit 103, the frame memory 104, the display device 105, the recording device 106, the operating system 107, and the power source system 108 are mutually connected through a bus line 109.

The optical system 101 receives incident light (image light) from a subject, to form an image on the image pickup surface of the image pickup unit 102. The image pickup unit 102 converts the light intensity of the incident light having the image formation on the image pickup surface by the optical system 101, into an electric signal in units of pixels and outputs as a pixel signal. The CMOS image sensor 10 according to each of the embodiments described above can be used as the image pickup unit 102.

The DSP circuit 103 performs typical camera signal processing, such as white balance processing, demosaic processing, or gamma correction processing. The frame memory 104 is used to appropriately store data in the process of the signal processing by the DSP circuit 103. The display device 105 includes a panel-type display device, such as a liquid crystal display device or an organic electro luminescence (EL) display device, and displays a moving image or a still image picked up by the image pickup unit 102.

The recording device 106 records the moving image or the still image picked up by the image pickup unit 102, into a recording medium, such as a transportable semiconductor memory, an optical disc, or a hard disk drive (HDD). The operating system 107 issues operating commands for various functions included in the present image pickup device 100, under an operation of a user. The power source system 108 appropriately supplies various power sources to be operating power sources for the DSP circuit 103, the frame memory 104, the display device 105, the recording device 106, and the operating system 107, to the objects to be supplied.

Providing the CMOS image sensor 10 according to each of the embodiments described above as the image pickup unit 102 in the electronic apparatus according to the present disclosure described above (namely, in the image pickup device 100) can acquire the following function and effect. That is, the circuit operation according to each of the first and second embodiments can avoid the degradation in image quality arising from the digital noise, with no increase in the power consumption. Therefore, the CMOS image sensor 10 to which the circuit operation according to each of the first and second embodiments is applied can contribute to enhancement in image quality of the electronic apparatus.

Note that, the present disclosure can have the following configurations.

[1] A solid-state image pickup element including:

an analog circuit unit configured to perform reading of a pixel signal from a unit pixel and to perform A/D conversion processing;

a digital circuit unit configured to perform signal output processing of outputting pixel data after the A/D conversion processing, in parallel with the reading of the pixel signal and the A/D conversion processing; and a control unit configured to cause the digital circuit unit to perform the processing over a period from a processing start timing to a processing finish timing in the analog circuit unit, while the control unit is controlling a speed of a clock being a criterion for an operation of the digital circuit unit.

[2] The solid-state image pickup element described [1] above, in which the control unit decimates the clock being the criterion for the operation of the digital circuit unit, to control the speed of the clock.

[3] A method of driving a solid-state image pickup element, the solid-state image pickup element including:

an analog circuit unit configured to perform reading of a pixel signal from a unit pixel and to perform A/D conversion processing; and a digital circuit unit configured to perform signal output processing of outputting pixel data after the A/D conversion processing, in parallel with the reading of the pixel signal and the A/D conversion processing, the method including causing the digital circuit unit to perform the processing over a period from a processing start timing to a processing finish timing in the analog circuit unit, while controlling a speed of a clock being a criterion for an operation of the digital circuit unit.

[4] An electronic apparatus including:

a solid-state image pickup element including: an analog circuit unit configured to perform reading of a pixel signal from a unit pixel and to perform A/D conversion processing;

a digital circuit unit configured to perform signal output processing of outputting pixel data after the A/D conversion processing, in parallel with the reading of the pixel signal and the A/D conversion processing; and a control unit configured to cause the digital circuit unit to perform the processing over a period from a processing start timing to a processing finish timing in the analog circuit unit, while the control unit is controlling a speed of a clock being a criterion for an operation of the digital circuit unit.

[5] A solid-state image pickup element including:

an analog circuit unit including an A/D converter including a comparator configured to compare a pixel signal and a reference signal, the analog circuit unit being configured to perform reading of the pixel signal from a unit pixel and to perform A/D conversion processing;

a digital circuit unit configured to perform signal output processing of outputting pixel data after the A/D conversion processing, in parallel with the reading of the pixel signal and the A/D conversion processing; and a control unit configured to supply a clock being a criterion for an operation to the digital circuit unit during at least one of a reset period and a pixel signal A/D conversion period in the comparator.

[6] The solid-state image pickup element described in [5] above, in which the analog circuit unit performs the A/D conversion processing to a reset component and a signal component read on a time-series basis as the pixel signal from the unit pixel, and the control unit supplies the clock to the digital circuit unit during at least one of the reset period, a reset component A/D conversion period, and a signal component A/D conversion period in the comparator.

[7] The solid-state image pickup element described in [6] above, in which the control unit supplies the clock to the digital circuit unit during at least one of the reset component A/D conversion period and the signal component, except the reset period in the comparator.

[8] The solid-state image pickup element described in [7] above, in which the control unit supplies the clock to the digital circuit unit during one of the reset component A/D conversion period and the signal component, while the control unit performs a dummy clock operation and digital operation during the other period.

[9] A method of driving a solid-state image pickup element, the solid-state image pickup element including:

an analog circuit unit including an A/D converter including a comparator configured to compare a pixel signal and a reference signal, the analog circuit unit being configured to perform reading of the pixel signal from a unit pixel and to perform A/D conversion processing; and a digital circuit unit configured to perform signal output processing of outputting pixel data after the A/D conversion processing, in parallel with the reading of the pixel signal and the A/D conversion processing, the method including supplying a clock being a criterion for an operation to the digital circuit unit during at least one of a reset period and a pixel signal A/D conversion period in the comparator.

[10] An electronic apparatus including a solid-state image pickup element, the solid-state image pickup element including:

an analog circuit unit including an A/D converter including a comparator configured to compare a pixel signal and a reference signal, the analog circuit unit being configured to perform reading of the pixel signal from a unit pixel and to perform A/D conversion processing;

a digital circuit unit configured to perform signal output processing of outputting pixel data after the A/D conversion processing, in parallel with the reading of the pixel signal and the A/D conversion processing; and a control unit configured to supply a clock being a criterion for an operation to the digital circuit unit during at least one of a reset period and a pixel signal A/D conversion period in the comparator.

REFERENCE SIGNS LIST

10 CMOS image sensor
11 Pixel array unit
12 Row scanning unit
13 Column processing unit
14 Reference signal generating unit
15 Column scanning unit
16 Horizontal output line
17 Video signal processing unit
18 Output control unit
19 Timing control unit
20 Unit pixel
21 Photodiode (PD)
22 Transfer transistor
23 Reset transistor
24 Amplification transistor
25 Selection transistor
26 FD part (Electric charge detection part)
30 Semiconductor substrate
31($31_{-1}$ to $31_{-m}$) Row control lines
32($32_{-1}$ to $32_{-n}$) Column signal lines
40($40_{-1}$ to $40_{-n}$) A/D converters
41 Comparator
42 Up/down counter
43 Latch circuit

The invention claimed is:

1. A solid-state image pickup element, comprising:
an analog circuit unit configured to:
execute a reading process to read a first pixel signal from a unit pixel; and
execute an analog to digital (A/D) conversion process on the first pixel signal;

a digital circuit unit configured to execute a signal output process to output pixel data, wherein
the pixel data is output after an A/D conversion process on a second pixel signal, and
the execution of the signal output process is in parallel with the execution of each of the reading process to read the first pixel signal and the A/D conversion process on the first pixel signal; and
a control unit configured to control a speed of a clock signal,
wherein
the digital circuit unit is further configured to execute the signal output process over a period from a processing start time in the analog circuit unit to a processing finish time in the analog circuit unit, and
the execution of the signal output process over the period is based on the controlled speed of the clock signal.

2. The solid-state image pickup element according to claim 1, wherein the control unit is further configured to decimate the clock signal to control the speed of the clock signal.

3. A method, comprising:
in a solid-state image pickup element, wherein the solid-state image pickup element includes an analog circuit unit and a digital circuit unit:
reading, by the analog circuit unit, a first pixel signal from a unit pixel;
executing, by the analog circuit unit, an analog to digital (A/D) conversion process on the first pixel signal;
executing, by the digital circuit unit, a signal output process to output pixel data, wherein
the pixel data is output after an A/D conversion process on a second pixel signal, and
the execution of the signal output process is in parallel with each of the reading of the first pixel signal and the execution of the A/D conversion process on the first pixel signal; and
controlling a speed of a clock signal,
wherein
the execution of the signal output process by the digital circuit unit is over a period from a processing start time in the analog circuit unit to a processing finish time in the analog circuit unit, and
the execution of the signal output process over the period is based on the controlled speed of the clock signal.

4. An electronic apparatus, comprising:
a solid-state image pickup element, wherein the solid-state image pickup element includes:
an analog circuit unit configured to:
execute a reading process to read a first pixel signal from a unit pixel; and
execute an analog to digital (A/D) conversion process on the first pixel signal;
a digital circuit unit configured to execute a signal output process to output pixel data, wherein
the output of the pixel data is after an A/D conversion process on a second pixel signal, and
the execution of the signal output process is in parallel with the execution of each of the reading process to read the first pixel signal and the A/D conversion process on the first pixel signal; and
a control unit configured to control a speed of a clock signal,
wherein
the digital circuit unit is further configured to execute the signal output process over a period from a processing start time in the analog circuit unit to a processing finish time in the analog circuit unit, and
the execution of the signal output process over the period is based on the controlled speed of the clock signal.

5. A solid-state image pickup element, comprising:
an analog circuit unit configured to:
execute a reading process to read a first pixel signal from a unit pixel, wherein
the analog circuit unit includes an analog to digital (A/D) converter, and
the A/D converter includes a comparator configured to compare the first pixel signal and a reference signal; and
execute an A/D conversion process on the first pixel signal;
a digital circuit unit configured to execute a signal output process to output pixel data, wherein
the output of the pixel data is after an A/D conversion process on a second pixel signal, and
the execution of the signal output process is in parallel with the execution of each of the reading process to read the first pixel signal and the A/D conversion process on the first pixel signal; and
a control unit configured to supply a clock signal to the digital circuit unit in at least one of a reset period or a pixel signal A/D conversion period, wherein
the at least one of the reset period or the pixel signal A/D conversion period is associated with the comparator, and
the digital circuit unit is further configured to execute the signal output process based on the clock signal.

6. The solid-state image pickup element according to claim 5, wherein
the analog circuit unit is further configured to:
read, a reset component and a signal component on a time-series basis from the unit pixel, as the first pixel signal; and
execute the A/D conversion process on the reset component and the signal component,
the control unit is further configured to supply the clock signal to the digital circuit unit in at least one of the reset period, a reset component A/D conversion period, or a signal component A/D conversion period, and
the at least one of the reset period, the reset component A/D conversion period or the signal component A/D conversion period is associated with the comparator.

7. The solid-state image pickup element according to claim 6, wherein the control unit is further configured to supply the clock signal to the digital circuit unit in at least one of the reset component A/D conversion period or the signal component A/D conversion period.

8. The solid-state image pickup element according to claim 7, wherein the control unit is further configured to:
supply the clock signal to the digital circuit unit in one of the reset component A/D conversion period or the signal component A/D conversion period; and
execute each of a dummy clock operation and a digital operation in other of one of the reset component A/D conversion period or the signal component A/D conversion period.

9. A method, comprising:
in a solid-state image pickup element, wherein the solid-state image pickup element includes an analog circuit unit and a digital circuit unit:
reading, by the analog circuit unit, a first pixel signal from a unit pixel, wherein
the analog circuit unit includes an analog to digital (A/D) converter, and
the A/D converter includes a comparator configured to compare the first pixel signal and a reference signal;
executing, by the analog circuit unit, an A/D conversion process on the first pixel signal;
executing, by the digital circuit unit, a signal output process to output pixel data, wherein
the output of the pixel data is after an A/D conversion process on a second pixel signal, and
the execution of the signal output process is in parallel with each of the reading of the first pixel signal and the execution of the A/D conversion process on the first pixel signal; and
supplying a clock signal to the digital circuit unit in at least one of a reset period or a pixel signal A/D conversion period, wherein
the at least one of the reset period and the pixel signal A/D conversion period is associated with the comparator.

10. An electronic apparatus, comprising:
a solid-state image pickup element, wherein the solid-state image pickup element includes:
an analog circuit unit configured to:
execute a reading process to read a first pixel signal from a unit pixel, wherein
the analog circuit unit includes an analog to digital (A/D) converter, and
the A/D converter includes a comparator configured to compare the first pixel signal and a reference signal; and
execute an A/D conversion process on the first pixel signal;
a digital circuit unit configured to execute a signal output process to output pixel data, wherein
the output of the pixel data is after an A/D conversion process on a second pixel signal,
the execution of the signal output process is in parallel with each of the execution of the reading process to read the first pixel signal and the execution of the A/D conversion process on the first pixel signal; and
a control unit configured to supply a clock signal to the digital circuit unit in at least one of a reset period or a pixel signal A/D conversion period, wherein
the reset period and the pixel signal A/D conversion period are associated with the comparator, and
the digital circuit unit is further configured to execute the signal output process based on the clock signal.

11. A solid-state image pickup element, comprising:
an analog circuit unit configured to:
execute a reading process to read, as a first pixel signal, a reset component and a signal component from a unit pixel on a time-series basis, wherein
the analog circuit unit includes an analog to digital (A/D) converter, and
the A/D converter includes a comparator configured to compare the first pixel signal and a reference signal; and
execute an A/D conversion process on the first pixel signal;
a digital circuit unit configured to execute a signal output process to output pixel data, wherein
the output of the pixel data is after an A/D conversion process on a second pixel signal,
the execution of the signal output process is in parallel with each of the execution of the reading process to read the first pixel signal and the execution of the A/D conversion process of the first pixel signal; and
a control unit configured to supply a clock signal to the digital circuit unit in at least one of a reset period, a reset component A/D conversion period, or a signal component A/D conversion period,
wherein the at least one of the reset period, the reset component A/D conversion period, and the signal component A/D conversion period is associated with the comparator.

* * * * *